United States Patent
Liu (10) Patent No.: US 9,499,025 B2
(45) Date of Patent: Nov. 22, 2016

(54) AIR-CONDITIONING LOOP FUNCTIONING AS A PULSE ELECTRO-THERMAL DEICING HEAT PUMP

(71) Applicant: Valeo Systemes Thermiques, Le Mesnil Saint Denis (FR)

(72) Inventor: Jin Ming Liu, Conflans Sainte Honorine (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 190 days.

(21) Appl. No.: 14/379,103

(22) PCT Filed: Feb. 12, 2013

(86) PCT No.: PCT/EP2013/052740
§ 371 (c)(1),
(2) Date: Aug. 15, 2014

(87) PCT Pub. No.: WO2013/120828
PCT Pub. Date: Aug. 22, 2013

(65) Prior Publication Data
US 2015/0020533 A1    Jan. 22, 2015

(51) Int. Cl.
*F25B 41/00* (2006.01)
*B60H 1/00* (2006.01)
*F25D 21/06* (2006.01)

(52) U.S. Cl.
CPC ...... *B60H 1/00007* (2013.01); *B60H 1/00785* (2013.01); *B60H 1/00914* (2013.01); *F25D 21/06* (2013.01)

(58) Field of Classification Search
CPC ...... F25B 47/022; F25B 41/062; F25B 1/10; F25B 13/00

USPC ............................ 62/81, 115, 498, 239, 244
See application file for complete search history.

(56) References Cited

U.S. PATENT DOCUMENTS

| 5,586,448 A | 12/1996 | Ikeda et al. |
| 2011/0146942 A1 | 6/2011 | Wittmann et al. |

FOREIGN PATENT DOCUMENTS

| EP | 0681933 A1 | 11/1995 |
| EP | 1000784 A2 | 5/2000 |

(Continued)

OTHER PUBLICATIONS

English language abstract for FR2954463 extracted from espacenet.com database on Oct. 10, 2014, 2 pages. Also see English equivalent US 2011/0146942.

(Continued)

*Primary Examiner* — Melvin Jones
(74) *Attorney, Agent, or Firm* — Howard & Howard Attorneys PLLC (57) ABSTRACT

The invention relates to an air-conditioning loop for heating, ventilation, and/or air-conditioning equipment in which a coolant circulates. The loop including a compressor comprising a coolant outlet connected to a delivery pipe and a coolant inlet connected to a suction pipe. The loop also including an internal heat exchanger which is capable of functioning at least as a condenser, and which is connected to the compressor via the delivery pipe. The loop also including an external unit which is connected to the compressor via the suction pipe and which includes at least one external heat exchanger capable of functioning at least as an evaporator, with the internal heat exchanger being connected to the external unit via a first intermediate duct comprising at least one pressure-release member. The loop includes a deicing pipe connected to the compressor and/or to the delivery pipe, as well as to the external unit.

20 Claims, 3 Drawing Sheets

(56) References Cited

FOREIGN PATENT DOCUMENTS

FR 2954463 A1 6/2011
FR 2958019 A1 9/2011

OTHER PUBLICATIONS

English language abstract and machine-assisted English translation for FR2958019 extracted from espacenet.com database on Oct. 10, 2014, 19 pages.
International Search Report for PCT/EP2013/052740 dated Mar. 8, 2013, 5 pages.

AIR-CONDITIONING LOOP FUNCTIONING AS A PULSE ELECTRO-THERMAL DEICING HEAT PUMP

RELATED APPLICATIONS

This application is the National Stage of International Patent Application No. PCT/EP2013/052740, filed on Feb. 12, 2013, which claims priority to and all the advantages of French Patent Application No. 12/51408, filed on Feb. 16, 2012, the content of which is incorporated herein by reference.

The present invention relates to the technical field of air conditioning loops with a coolant and compressor used in the heating, ventilation and/or air conditioning systems of an internal air stream intended to be distributed in a passenger compartment in particular of a motor vehicle.

In the field of such heating, ventilation and/or air conditioning systems it is known to implement a motorised fan unit which draws in an air stream in order to blow it into an air stream thermal conditioning housing in order to generate the internal air stream which is thermally treated and directed towards the interior of the passenger compartment. The main function of the air stream thermal conditioning housing is to condition the internal air stream at a set-point temperature determined by a user of the vehicle. To this end, the thermal conditioning housing comprises means for heating, dehumidification and/or cooling of the internal air stream.

In the case of a vehicle with an internal combustion engine, such means are most generally formed on the one hand by a radiator connected to the cooling system of the internal combustion engine for heating of the internal air stream and on the other hand by an evaporator of an air conditioning loop for dehumidification and/or cooling of the internal air stream.

In the case of a hybrid or completely electric vehicle it is not possible to use the cooling circuit of an internal combustion engine as a heat source.

Also, it has been proposed to implement a heating, ventilation and/or air conditioning system adapted to have a so-called "cooling" mode of operation in order to ensure the dehumidification and/or cooling of the internal air stream and a so-called "heat pump" mode of operation in order to ensure the heating of the internal air stream with a higher output than would be obtained with an electric radiator. Such a heating, ventilation and/or air conditioning system is reversible and is therefore particularly suitable for a vehicle of which the energy consumption is to be controlled. Such an air conditioning loop is described in the patent application FR 2 954 463.

In the case of a so-called "heat pump" mode of operation an internal heat exchanger is used as a condenser in order to heat the internal air stream directly or indirectly, via a heat transfer fluid, whilst an external heat exchanger is used as an evaporator in order to extract the heat from an external air stream. Taking into account the humidity of the external air stream, the external heat exchanger tends to be covered by a layer of ice in such a way that the external heat exchanger is no longer able to effectively ensure the function of evaporator.

In order to proceed to the deicing of the external heat exchanger, it has been proposed to reverse the mode of operation of the air conditioning loop in such a way as to supply the external heat exchanger with hot cooling gas and thus to deice it.

However, during the reversal of the mode of operation of the air conditioning loop, the internal heat exchanger is no longer supplied with hot coolant gas, so that the heating of the passenger compartment is no longer possible. In the winter period such a stoppage is detrimental to the comfort of passengers in the passenger compartment of the vehicle.

Thus it has become apparent that there is a need for a new type of air conditioning loop which can operate in a so-called "heat pump" mode of operation and of which the external heat exchanger can be deiced without impairing the comfort of passengers in the passenger compartment of the vehicle.

In order to achieve this objective the invention proposes an air conditioning loop for a heating, ventilation, and/or air conditioning system, in particular for the passenger compartment of a vehicle, in which a coolant circulates, and which is capable of functioning in at least a so-called "heat pump" mode of operation in order to heat the passenger compartment, including at least a compressor including a coolant outlet connected to a delivery pipe and a coolant inlet connected to a suction pipe, an internal heat exchanger which is capable of functioning at least as a condenser, and which is connected to the compressor via the delivery pipe, and an external unit which is connected to the compressor via the suction pipe and which includes at least one external heat exchanger capable of functioning at least as an evaporator, the internal heat exchanger being connected to the external unit via a first intermediate pipe including at least one first expansion element.

More particularly the air conditioning loop comprises a deicing pipe connected on the one hand to the compressor and/or to the delivery pipe and on the other hand to the external unit.

The invention makes it possible in an advantageous manner to maintain the supply of coolant to the internal heat exchanger during the deicing of the external unit in such a way that the heating of the passenger compartment is not interrupted. Thus the comfort of the passenger compartment in the course of heating is not altered.

According to a characteristic of the invention, the deicing pipe includes a second expansion element.

Moreover, the air conditioning loop comprises a control unit which controls the first expansion element and/or the second expansion element, in order to distribute the coolant coming from the compressor between the internal heat exchanger and the external unit and/or to place the external unit at a temperature higher than 0° C.

Preferably, the air conditioning loop comprises ice detection means in the external unit connected to the control unit. With this arrangement, the control unit is suitable so that:
  if the quantity of ice present in the external unit is less than a predetermined threshold, to arrange the air conditioning loop in a so-called "heat pump" mode of operation, wherein the second expansion element is closed,
  if the quantity of ice present in the external unit is less than a predetermined threshold, to arrange the air conditioning loop in a so-called "deicing" mode of operation, wherein the first expansion element and the second expansion element are open at least in part.

According to the present invention, it is possible to perform the opening and the closing of the first expansion element and/or of the second expansion element according to predefined cycles, in order to define a pulsed deicing, corresponding to the sequences during which the coolant circulates in the deicing pipe.

The present invention also covers a method of control of such an air conditioning loop in order to enable the opening and the closing of the first expansion element and/or of the second expansion element.

This characteristic of the invention makes it possible to limit the duration of operation in the so-called "deicing" mode of operation to what is strictly necessary, in such a way that the duration of the reduction of the heat output available in the region of the internal heat exchanger is limited.

According to another characteristic of the invention, the control unit is suitable, in the so-called "defrosting" mode of operation, for establishing in at least a part of the external unit a pressure at a value higher than the value at which the temperature of the coolant is higher than 0° C.

Advantageously, the external unit may be composed of one or more heat exchangers.

According to a first embodiment, the external heat exchanger is a reversible heat exchanger which is capable of operating as an evaporator or as a condenser.

Advantageously, the external heat exchanger is connected to the intermediate pipe and to the suction pipe.

Moreover, the external unit comprises an additional external heat exchanger. The additional external heat exchanger is preferably disposed in parallel with the external heat exchanger.

According to this alternative, the external heat exchanger is connected to the deicing pipe and to the suction pipe.

The additional external heat exchanger is preferably a reversible heat exchanger which is capable of operating as an evaporator or as a condenser.

Alternatively, the additional external heat exchanger is capable of operating solely as a condenser.

According to another embodiment, the external unit comprises two reversible heat exchangers which are capable of operating as an evaporator or as a condenser and are disposed in parallel. According to this particular example, a first reversible exchanger is connected to the deicing pipe and to the suction pipe and the second reversible exchanger is connected to the intermediate pipe and to the suction pipe.

According to another characteristic of the present invention, the external unit comprises a bypass pipe connecting the deicing pipe and the first intermediate pipe. The bypass pipe advantageously includes a valve, preferably controlled by the control unit.

According to another embodiment of the present invention the external unit comprises a first external heat exchanger which is capable of operating solely as an evaporator and is connected to the intermediate pipe and to the suction pipe, and a second external heat exchanger which is capable of operating solely as a condenser, is disposed in parallel with the first external heat exchanger and is connected to the deicing pipe and to the suction pipe.

According to an additional characteristic of the present invention, the external unit is adapted for an external air stream to pass through it. The external air stream preferably circulates through the additional external heat exchanger, operating as condenser, before passing through the external heat exchanger. Such a mode of operation of the external unit enables the external air stream to be heated by the additional external heat exchanger operating as condenser, so as to melt the ice present on the external heat exchanger.

According to a characteristic of the invention, the air conditioning loop comprises, downstream of the external unit, a coolant accumulator connected to the suction pipe.

Advantageously, the compressor is a variable flow compressor. Likewise, preferably, the first expansion element, or respectively the second expansion element, has variable pressure and variable flow, controlled by the control unit.

Of course, the different characteristics, variants and/or embodiments of the present invention may be associated with one another according to various combinations in so far as they are not incompatible with or exclusive of one another.

The present invention will be better understood and other characteristics and advantages of the invention will become more apparent on reading the following detailed description comprising embodiments given by way of illustration with reference to the accompanying drawings, given by way of non-limiting examples, which could serve to enhance the understanding of the present invention and the description of the implementation thereof and, as appropriate, contribute to the definition thereof, in which.

It should be noted that in the drawings the structural and/or functional elements common to the different embodiments may have the same references. Thus, unless otherwise specified, such elements have identical structural, dimensional and material properties.

Figure 1:
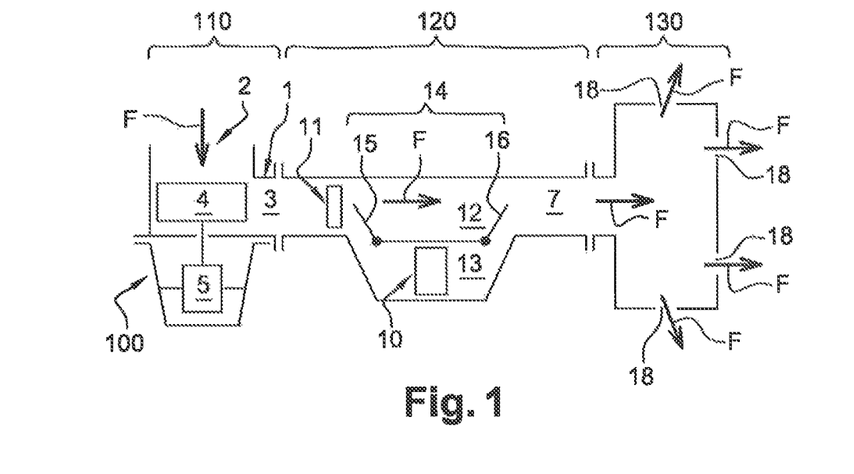
FIG. 1 is a schematic view of a housing for thermal conditioning of an internal air stream of a vehicle passenger compartment.

FIG. 1 is a schematic view of a thermal conditioning housing 100 for the thermal treatment of an internal air stream intended to be distributed in a vehicle passenger compartment. The thermal conditioning housing 100 comprises, in the direction of circulation of the internal air stream indicated by the arrows F, a ventilation unit 110, a thermal treatment unit 120 and a distribution unit 130.

According to the embodiment of FIG. 1, the ventilation unit 110 comprises a ventilation box 1 including at least one air inlet 2 and at least one air outlet 3. The ventilation box 1 includes a turbine 4, driven in rotation by an electric motor 5, in order to circulate the internal air stream in the thermal conditioning housing 100.

The air outlet 3 of the ventilation unit 110 is connected to an inlet of the thermal treatment unit 120. Moreover, the thermal treatment unit 120 comprises a treated air outlet 7 connected to an inlet of the distribution unit 130.

In order to ensure the heating function, the thermal treatment unit 120 includes at least one heating means 10. According to the present invention, the heating means 10 is composed of an internal heat exchanger 220, in particular a condenser 220, arranged in an air conditioning loop 200, shown in FIGS. 2 to 5. Of course, the heating means 10 could also comprise an electrical heating element.

The thermal treatment unit 120 also comprises at least one cooling means 11. According to the present invention, the cooling means 11 is composed of an evaporator arranged in the air conditioning loop 200.

The thermal treatment unit 120 also comprises circulation channels 12 and 13 for the internal air stream, of which the opening and the closing are controlled by at least one mixing means 14, in particular produced in the form of two flaps 15 and 16. The mixing means 14 is controlled according to the thermal treatment of the desired internal air stream.

Advantageously, a first circulation channel 12, a so-called "cold air channel", is a channel allowing the circulation of the internal air stream coming directly from the cooling means 11, without being heated. A second circulation channel 13, a so-called "hot air channel", is a channel allowing the circulation of the internal air stream coming from the cooling means 11, through the heating means 10, in order to be heated there.

Consequently, the first circulation channel 12 and the second circulation channel 13 are grouped in order to define the internal air stream at a desired temperature intended to be distributed in the passenger compartment of the vehicle.

The distribution unit 130 is arranged at the outlet of the thermal treatment unit 120 and comprises at least one air outlet 18, intended to supply different mouths for distribution of air to the passenger compartment of the vehicle. The air outlet 18 is associated with at least one distribution flap, not shown, controlled according to commands from the user of the vehicle. Advantageously, the distribution unit 130 comprises a plurality of air outlets 18.

The embodiment of such a thermal conditioning housing 100 is well known to the person skilled in the art and therefore does not require further explanation.

Figure 2:
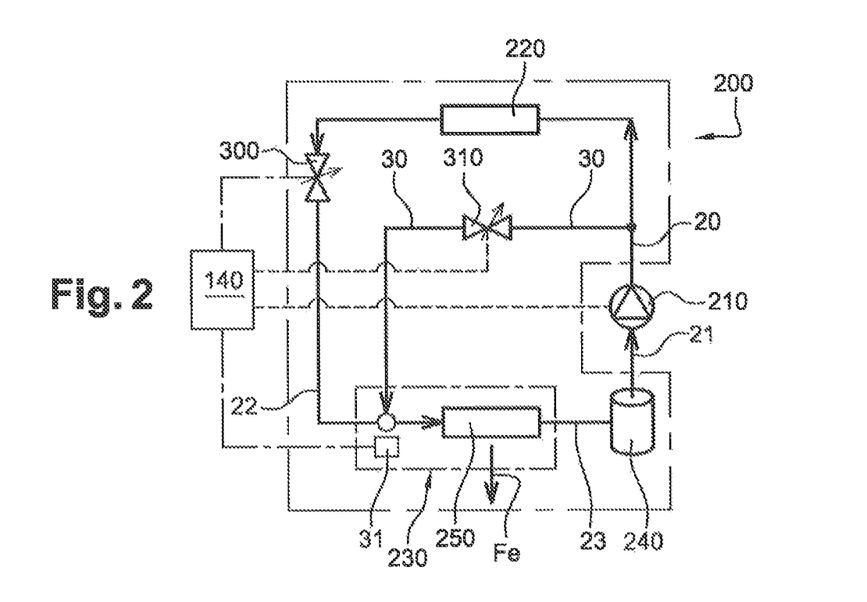
FIG. 2 is a simplified schematic view of an air conditioning loop according to a first alternative embodiment of the present invention.

The invention relates more particularly to the air conditioning loop 200, of which a first alternative embodiment according to the present invention is shown in FIG. 2 in a simplified schematic view.

According to the present invention, the terms "downstream", "upstream" and "parallel" qualify the position of one component with respect to another, according to the direction of circulation of coolant in the air conditioning loop 200.

In addition, according to the present invention the terms "open" and "closed" qualify the state of a valve for respectively allowing and/or blocking the passage of coolant.

The air conditioning loop 200 comprises a compressor 210 which ensures the circulation and the compression of a coolant circulating in the air conditioning loop 200. The compressor 210 is advantageously controlled by a control unit 140.

The coolant circulating in the air conditioning loop 200 may be of any appropriate type. For example, the coolant may be a super-critical fluid, such as carbon dioxide known by the designation R744. Nevertheless, the coolant may be a sub-critical fluid, such as a hydrofluorocarbon, for example the coolant known under the designation R134a, or a coolant with a low environmental impact, for example the coolant known by the designation R1234yf, or else a halogenated hydrocarbon or a mixture of halogenated hydrocarbons.

The compressor 210 is connected, downstream of the compressor 210, to a delivery pipe 20 and, upstream, to a suction pipe 21.

Downstream of the compressor 210, the air conditioning loop 200 comprises, in the direction of circulation of the coolant, the internal heat exchanger 220, an external unit 230, and a coolant reservoir or accumulator 240.

The internal heat exchanger 220 is, on the one hand, connected to the delivery pipe 20 and, on the other hand, to a first intermediate pipe 22. In addition, the first intermediate pipe 22 connects the internal heat exchanger 220 to the external unit 230. The intermediate pipe is controlled by a first expansion element 300. The first expansion element 300 advantageously has variable pressure and variable flow, and is controlled by the control unit 140. Moreover, alternately or additionally the first expansion element 300 may likewise include a closure means, making it possible to prevent the circulation of coolant. Preferably, the first expansion element 300 is an expansion valve, for example a thermostatic or electronic expansion valve.

The external unit 230 is connected to the coolant accumulator 240 by a second intermediate pipe 23. Finally, the coolant accumulator 240 is connected to the compressor 210 by the suction pipe 21.

Additionally or alternatively an evaporator, in particular constituting the cooling means 11 of the thermal conditioning housing 100, and an additional expansion element, may be disposed downstream of the external unit 230 and upstream of the compressor 210. Such an evaporator may be arranged outside the external unit 230 or in the external unit 230. It may likewise be disposed downstream of the junction point between the second intermediate pipe 23 and a deicing pipe 30, of which the function and the arrangement will be described below.

The internal heat exchanger 220 is suitable for operating at least as a condenser when the air conditioning loop 200 operates in the so-called "heat pump" mode of operation in such a way as to ensure the heating of the internal air stream, prior to the distribution in the passenger compartment of the vehicle.

Moreover, the external unit 230 is placed in the external environment with respect to the passenger compartment in such a way as to exchange heat with an external air stream Fe. In order to allow the extraction of heat, the external unit 230 comprises at least one external heat exchanger 250, for example of the air/coolant type, which is suitable for operating at least as an evaporator. According to the illustrated embodiment, the external heat exchanger 250 is a reversible heat exchanger 250 which is suitable for operating as an evaporator or as a condenser, according to the mode of operation of the air conditioning loop 200.

When the air conditioning loop 200 operates in the so-called "heat pump" mode of operation, the temperature of the external heat exchanger 250 may be low and so the humidity present in the external air stream Fe may condense in the external unit 230 and form a layer of ice on the surface of the external heat exchanger 250.

Beyond a given threshold, the layer of ice formed on the surface of the external heat exchanger 250 can significantly affect the performance of the external heat exchanger 250 and consequently the output of the air conditioning loop 200, so that it is necessary to deice the external unit 230 and more particularly the external heat exchanger 250.

To this end, the present invention proposes to implement a deicing pipe 30. The deicing pipe 30 makes it possible to connect the suction pipe 21 or the compressor 210 to the external unit 230. More particularly, according to the example shown in FIG. 2, the deicing pipe 30 makes it possible to connect the suction pipe 21 to the external heat exchanger 250.

The deicing pipe 30 is controlled by a second expansion element 310. Advantageously the second expansion element 310 has variable pressure and variable flow, and is controlled by the control unit 140. Moreover, alternatively or additionally the first expansion element 310 may likewise include a closure means, making it possible to prevent the circulation of coolant. Preferably, the first expansion element 310 is an expansion valve, for example a thermostatic or electronic expansion valve.

Finally, the air conditioning loop 200 also comprises ice detection means 31. Preferably, the ice detection means 31 are disposed in the external unit 230. The ice detection means 31 are connected to the control unit 140.

The so-called "heat pump" mode of operation of the air conditioning loop 200 thus constituted will now be described.

As long as the quantity of ice in the region of the external unit 230, and in particular in the region of the external heat exchanger 250, is below a predetermined threshold, said quantity in particular being determined by the ice detection means 31, the control unit 140 keeps the air conditioning loop 200 in the so-called maximum "heat pump" mode of operation.

In the so-called maximum "heat pump" mode of operation, the second expansion element 310 is closed and the control unit 140 controls the opening of the first expansion element 300 and of the compressor 210 in accordance with the set-point temperature for the heating of the internal air stream to be distributed in the passenger compartment.

The compressor 210 is preferably of the variable flow and/or variable displacement type so as to offer great flexibility of regulation.

When the quantity of ice in the region of the external unit 230 is above a predetermined threshold, in particular determined by the ice detection means 31, the control unit 140 places the air conditioning loop 200 in a so-called "deicing" mode of operation until the layer of ice present in the external unit 230 is again below the predetermined threshold.

During the "deicing" mode of operation, the control unit 140 controls the opening of the second expansion element 310 so as to supply the external unit 230, in particular the external heat exchanger 250, with coolant at a temperature greater than 0° C. During the so-called "deicing" mode of operation, the control unit 140 also keeps the first expansion element 300 open so that the internal heat exchanger 220 is kept supplied with hot coolant coming from the compressor 210 and can continue to heat the air stream to be distributed in the passenger compartment.

By controlling the first expansion element 300, the second expansion element 310 and the compressor 210 during the so-called "deicing" mode of operation, the control unit 140 distributes the heat output available between the internal heat exchanger 220 and the external unit 230.

According to the example described previously, the external unit 230 comprises only the external heat exchanger 250. Nevertheless, the external unit 230 may comprise more than one heat exchanger, in particular of the air/coolant type.

According to the present invention, the deicing of the external unit 230, in particular the external heat exchanger 250, is obtained by a succession of openings and closures of the second expansion element 310 in proportions such that a sufficient quantity of coolant at a suitable temperature is sent towards the external unit 230 so that the layer of ice can be eliminated.

Figure 3:
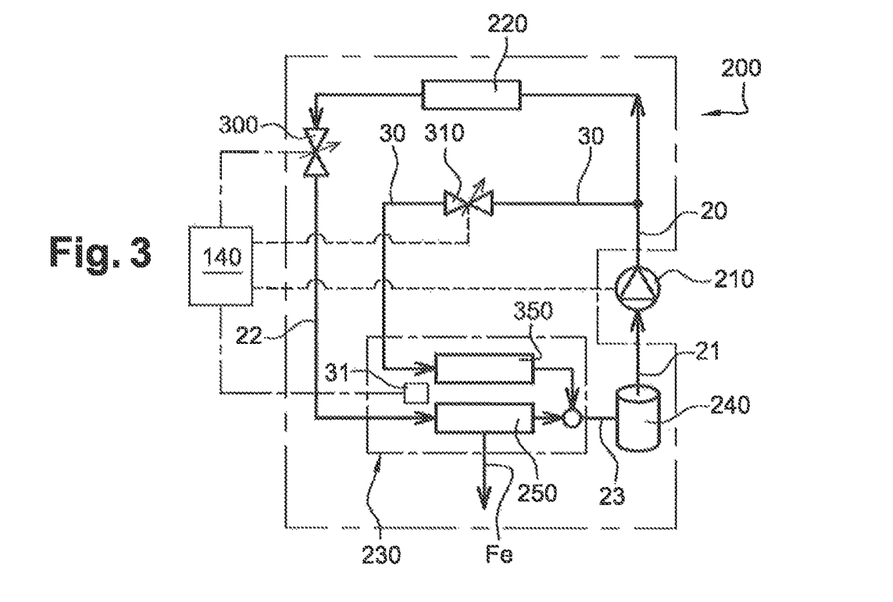
FIG. 3 is a simplified schematic view of an air conditioning loop according to a second alternative embodiment of the present invention.

FIG. 3 is a simplified schematic view of the air conditioning loop according to a second alternative embodiment of the present invention and illustrates another embodiment of the air conditioning loop 200 in which the external unit 230 comprises, as well as the reversible heat exchanger 250, an additional external heat exchanger 350.

According to the embodiment of FIG. 3, the additional external heat exchanger 350 is suitable for operating solely as a condenser. The additional external heat exchanger 350 is connected to the deicing pipe 30 downstream of the second expansion element 310 and to the second intermediate pipe 23 downstream of the external heat exchanger 250. According to this alternative embodiment, the external heat exchanger 250 is not connected to the deicing pipe 30.

The air conditioning loop 200 thus constituted operates in a so-called "heat pump" mode of operation and in a so-called "deicing" mode of operation as described previously.

It should be noted that the external unit 230 is suitable for the external air stream Fe to circulate there by passing through the additional external heat exchanger 350 before passing through the external heat exchanger 250 in order to be heated by the external air stream Fe that has been heated by the external heat exchanger 250 during the operation in the so-called "deicing" mode of operation.

Figure 4:
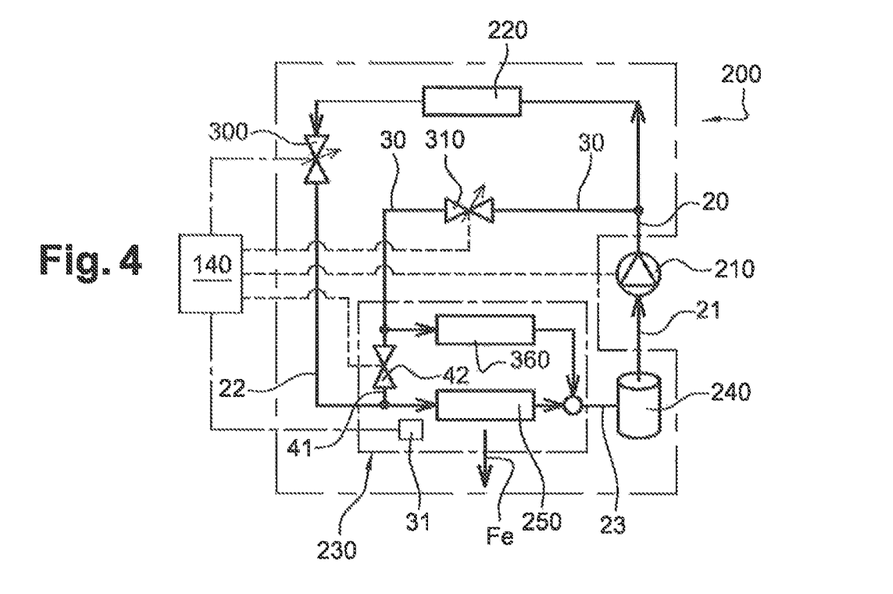
FIG. 4 is a simplified schematic view of an air conditioning loop according to a third alternative embodiment of the present invention.

FIG. 4 is a simplified schematic view of the air conditioning loop 200 according to a third alternative embodiment of the present invention, and illustrates another embodiment of the air conditioning loop 200.

According to the alternative embodiment illustrated in FIG. 4, the external unit 230 also comprises a bypass pipe 41 controlled by a valve 42, advantageously controlled by the control unit 140. According to the present invention, the bypass pipe 41 is optional.

Moreover, additionally, in the alternative embodiment illustrated in FIG. 4, the additional external heat exchanger 350 may be reversible and suitable for operating as a condenser or as an evaporator.

When the air conditioning loop 200 is arranged in the so-called "heat pump" mode of operation, the valve 42 is open, so that the external heat exchanger 250 and the additional heat exchanger 350 are used as evaporators. When the air conditioning loop 200 is arranged in the so-called "deicing" mode of operation, the valve 42 is closed, in such a way that the additional external heat exchanger 350 operates as a condenser and the external heat exchanger 250 operates as an evaporator.

Such an arrangement makes it possible to obtain a mixture of "hot" gases originating from the additional external heat exchanger 350 and "cold" gases originating from the external heat exchanger 250 in the region of the junction point between the second intermediate pipe 23 and the deicing pipe 30.

Moreover, according to two particular embodiments the coolant can pass through the valve 42 from the first intermediate pipe 22 towards the additional external heat exchanger 350, or from the deicing pipe 30 towards the external heat exchanger 250.

Figure 5:
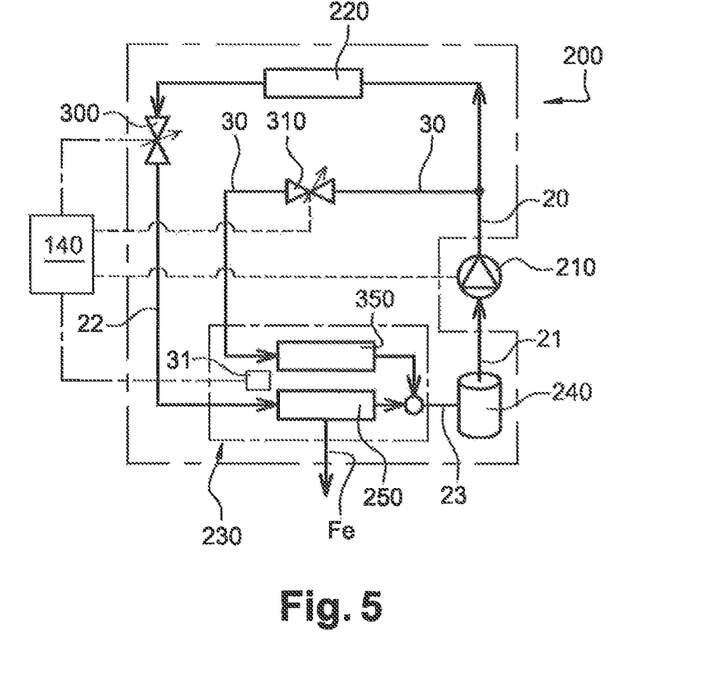
FIG. 5 is a simplified schematic view of an air conditioning loop according to a fourth alternative embodiment of the present invention.

FIG. 5 is simplified schematic view of an air conditioning loop according to a fourth alternative embodiment of the present invention and also illustrates another embodiment of the air conditioning loop 200 which differs from that described in relation to FIG. 3 in that the external heat exchanger 250 is suitable for operating solely as an evaporator. The air conditioning loop 200 thus produced operates as described previously.

Of course, various other modifications can be made to the air conditioning loop 200 according to the invention within the scope of the accompanying claims.

Quite obviously, the invention is not limited to the embodiments described above and given solely by way of example. It comprises various modifications, alternative forms and other variants which the person skilled in the art may envisage within the scope of the present invention and in particular all combinations of the different modes of operation described previously, which may be taken separately or together.

The invention claimed is:

1. An air conditioning loop (200) for a heating, ventilation and/or air conditioning system in which a coolant circulates and which is capable of functioning in at least one heat pump mode of operation in order to heat a passenger compartment, the air-conditioning loop comprising at least:

a compressor (210) comprising a coolant outlet connected to a delivery pipe (20) and a coolant inlet connected to a suction pipe (21);

an internal heat exchanger (220) which is capable of functioning at least as a condenser, and which is connected to the compressor (210) via the delivery pipe (20); and an external unit (230) which is connected to the compressor (210) via the suction pipe (21) and which includes at least one external heat exchanger (250) capable of functioning at least as an evaporator, with the internal heat exchanger (220) being connected to the external unit (230) via a first intermediate pipe (22) comprising at least one expansion element (300);

wherein the air conditioning loop (200) includes a deicing pipe (30) connected to the compressor (210) and/or to the delivery pipe (20), as well as to the external unit (230), wherein the deicing pipe (30) maintains the supply of coolant to the internal heat exchanger (220) during the deicing of the external unit (230) in such a way that the heating of the passenger compartment is not interrupted.

2. An air conditioning loop (200) according to claim 1, wherein the deicing pipe (30) includes a second expansion element (310).

3. An air conditioning loop (200) according to claim 1, further comprising a control unit (140) which controls the first expansion element (300) and/or a second expansion element (310), in order to distribute the coolant coming from the compressor (210) between the internal heat exchanger (220) and the external unit (230) and/or to place the external unit (230) at a temperature higher than 0° C.

4. An air conditioning loop according to claim 3, further comprising ice detection means (31) in the external unit (230) connected to the control unit (140).

5. An air conditioning loop according to claim 1, wherein the external heat exchanger (250) is a reversible heat exchanger which is capable of operating as an evaporator or as a condenser.

6. An air conditioning loop according to claim 1, wherein the external heat exchanger (250) is connected to the intermediate pipe (22) and to the suction pipe (21).

7. An air conditioning loop according to claim 1, wherein the external unit (230) comprises an additional external heat exchanger (350).

8. An air conditioning loop according to claim 7, wherein the additional external heat exchanger (350) is a reversible heat exchanger which is capable of operating as an evaporator or as a condenser.

9. An air conditioning loop according to claim 7, wherein the additional external heat exchanger (350) is disposed in parallel with the external heat exchanger (250).

10. An air conditioning loop according to claim 7, wherein the additional external heat exchanger (350) is connected to the deicing pipe (30) and to the suction pipe (21).

11. An air conditioning loop according to claim 1, wherein the external unit (230) comprises a bypass pipe (41) connecting the deicing pipe (30) and the first intermediate pipe (22).

12. An air conditioning loop according to claim 11, wherein the bypass pipe (41) includes a valve (42).

13. An air conditioning loop according to claim 1, further comprising a coolant accumulator connected to the suction pipe (21) downstream of the external unit (230).

14. A method for controlling an air conditioning loop according to claim 2, wherein:

if a quantity of ice present in the external unit (230) is less than a predetermined threshold, the air conditioning loop (200) is arranged in order to operate in the heat pump mode of operation, in which the second expansion element (310) is closed, and if the quantity of ice present in the external unit (230) is less than a predetermined threshold, the air conditioning loop (200) is arranged in order to operate in a deicing mode of operation, in which the first expansion element (300) and the second expansion element (310) are open at least in part.

15. An air conditioning loop according to claim 2, wherein the external heat exchanger (250) is a reversible heat exchanger which is capable of operating as an evaporator or as a condenser.

16. An air conditioning loop according to claim 2, wherein the external heat exchanger (250) is connected to the intermediate pipe (22) and to the suction pipe (21).

17. An air conditioning loop (200) for a heating, ventilation and/or air conditioning system in which a coolant circulates and which is capable of functioning in at least one heat pump mode of operation in order to heat a passenger compartment, the air-conditioning loop comprising at least:

a compressor (210) comprising a coolant outlet connected to a delivery pipe (20) and a coolant inlet connected to a suction pipe (21);

an internal heat exchanger (220) which is capable of functioning at least as a condenser, and which is connected to the compressor (210) via the delivery pipe (20); and an external unit (230) which is connected to the compressor (210) via the suction pipe (21) and which includes at least one external heat exchanger (250) capable of functioning at least as an evaporator, with the internal heat exchanger (220) being connected to the external unit (230) via a first intermediate pipe (22) comprising at least one expansion element (300);

wherein the air conditioning loop (200) includes a deicing pipe (30) connected to the compressor (210) and/or to the delivery pipe (20), as well as to the external unit (230), wherein the deicing pipe (30) includes a second expansion element (310).

18. A method for controlling an air conditioning loop according to claim 17, wherein:

if a quantity of ice present in the external unit (230) is less than a predetermined threshold, the air conditioning loop (200) is arranged in order to operate in the heat pump mode of operation, in which the second expansion element (310) is closed, and if the quantity of ice present in the external unit (230) is less than a predetermined threshold, the air conditioning loop (200) is arranged in order to operate in a deicing mode of operation, in which the first expansion element (300) and the second expansion element (310) are open at least in part.

19. An air conditioning loop according to claim 17, wherein the external heat exchanger (250) is a reversible heat exchanger which is capable of operating as an evaporator or as a condenser.

20. An air conditioning loop according to claim 17, wherein the external heat exchanger (250) is connected to the intermediate pipe (22) and to the suction pipe (21).

\* \* \* \* \*

UNITED STATES PATENT AND TRADEMARK OFFICE
CERTIFICATE OF CORRECTION

PATENT NO. : 9,499,025 B2  
APPLICATION NO. : 14/379103  
DATED : November 22, 2016  
INVENTOR(S) : Jin Ming Liu Page 1 of 1

It is certified that error appears in the above-identified patent and that said Letters Patent is hereby corrected as shown below:

On the Title Page

Please add a line item entitled: (30) Foreign Application Priority Data, and add the following under that line item: -- February 16, 2012 (FR) .......................... 12 51408 --

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*